Oct. 26, 1948.  O. L. FLUHARTY  2,452,186
SADDLE CLAMP STRUCTURE
Filed Jan. 17, 1947
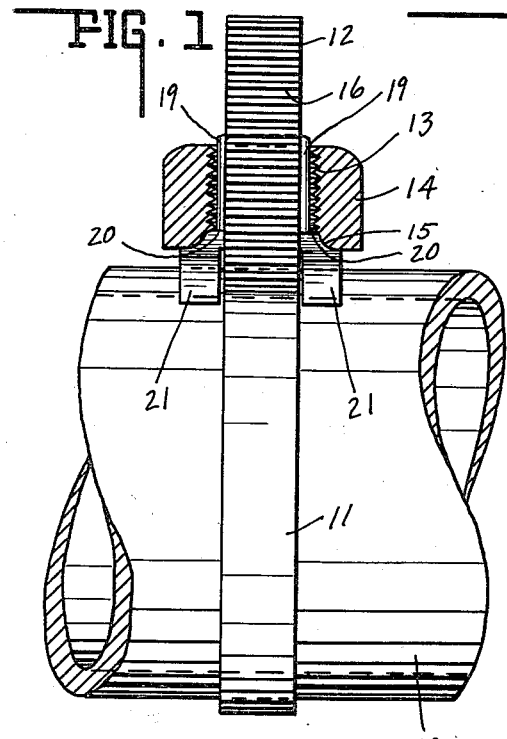
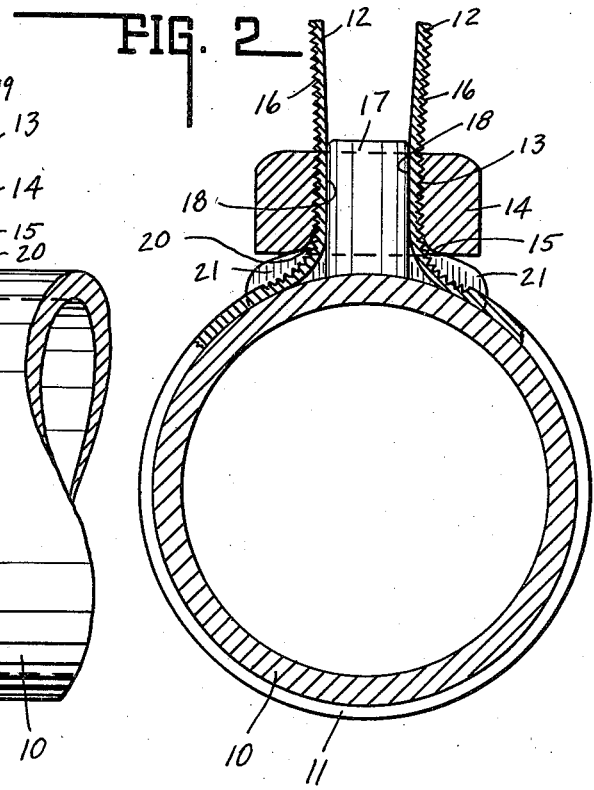
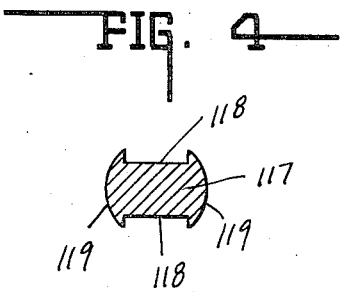
INVENTOR.
OMAR L. FLUHARTY.
BY
Lockwood, Goldsmith & Galt,
ATTORNEYS.

Patented Oct. 26, 1948

2,452,186

UNITED STATES PATENT OFFICE 2,452,186

SADDLE CLAMP STRUCTURE

Omar L. Fluharty, Indianapolis, Ind.

Application January 17, 1947, Serial No. 722,727

11 Claims. (Cl. 24—19)

This invention relates to a clamp structure for hose, pipe, conduit, rod and like member applications.

The clamp structure is of saddle type and is peculiarly applicable but not necessarily restricted to a cylindrical exterior.

This clamp structure, when applied to a hose, can clamp same to an inserted fitting for securing the fitting and hose against separation.

This clamp structure can also be used as a connecting support for adjustably supporting, for example, a lamp unit upon a standard.

The chief object of the present invention is to provide a simplified form of clamp comprising an enveloping member, a saddle and nut.

The chief feature of the present invention resides in the strap type enveloping member with substantially parallel disposed ends normally constrained to separated relation for nut locking purpose, said strap contacting the member to be clamped for the entire circumference of that member except for approximately the distance represented by the bore of the nut, the saddle contacting adjacent peripheral portions of that member in excess of and parallel to the strap omitted portion of the member periphery.

Other objects and features of the invention will be set forth more fully hereinafter.

The full nature of the invention will be understood from the accompanying drawings and the following description and claims:

In the drawings Fig. 1 is a side elevational view of a tubular member to be clamped, the strap and saddle, the nut being shown in central section.

Fig. 2 is a cross-sectional view of the device shown in Fig. 1.

Fig. 3 is a perspective view of the saddle and post member.

Fig. 4 is a transverse sectional view of a modified form of saddle post.

In Figs. 1 and 2 of the drawings 10 indicates a member to be clamped such as a tube, 11 a flat strap that nearly envelops the same and having initially slightly diverging ends 12 that yield to permit entrace into the bore 13 of a nut 14 having counterbore 15.

The opposed faces of said free ends are provided with threads 16 and of a circular diameter equal to that of the threads in the nut bore 13.

The saddle and post structure is shown most clearly in Fig. 3 but is also illustrated in Figs. 1 and 2. 17 indicates the post proper having opposite flat faces 18 contacted by the flat confronting faces of trap ends 12. The intermediate opposite faces 19 of the post are not provided with threads but are smooth for reasons assigned hereinafter.

Extending oppositely from said smooth post face portions 19 are the bosses 20 and integral with each are oppositely and arcuately directed wings 21. The intermediate boss and connected pair of arcuately disposed wings have an arcuate surface complementary to that of the member 10.

As shown clearly in Fig. 1, the spacing between said pairs of wings is slightly greater than the width of strap 11, or rather end 12 thereof.

With the strap in position about member 10, the saddle and post is applied to that member with the strap ends juxtapositioned to and separated from the faces 19 of the post 18. Then the nut is applied to and threaded down on the threaded portions of the strap ends. The post serves as a spacer.

Continued nut threading movement toward the member to be clamped results in the saddle being forced into engagement therewith and a tautening of band 11 upon the member. Since the strap ends are initially disposed in slight diverging relation, the said ends tend to lock the nut in place.

Obviously in the tightening application the saddle cannot twist since the confronting sides of the arcuate portions are disposed at opposite sides of the strap. Also the free ends cannot twist because they bear flatwise on the post and, at the base of said ends, are disposed between confronting faces of the arcuate wings on the saddle.

The foregoing therefore constitutes a simple, positive clamp structure that completely envelops a member to be clamped thereby. The nut projecting ends of the strap and/or the post may be utilized for lamp unit mounting and like purposes when desired. The counterbore in the nut accommodates the bosses 20 and provides clearance which permits the nut to seat close to the member 10.

Whenever it is desired to prevent any possible free end-post relative twist, the post 17, see Fig. 4 may be notched as at 118 to partially nest the strap free ends. Thus said ends, coextensive with the length of the post, are interlocked together to facilitate other member attachment thereto by threading and the like. In either instance the strap 11 has a flat face for member engagement thus distributing the clamping load and lowering the unit area stress.

By way of example only the strap ends may be stamped or forged to thread formation. Another method would be to mount the post and saddle on an undersize member and apply a stock and die simultaneously to the strap free ends. Other methods may be employed for strap end thread formation.

The present invention is characterized by the post 17 having curved opposite surfaces and spaced apart less than the threads in the nut. The flat strap ends obviously are curved in cross-section when provided with threads.

The sole clamping action is by tensioning of the band, the nut counterbore surface 15 riding or bearing upon the complementary surfaced oppositely disposed bosses 20 which in effect serve as fulcrums in the initial tautening of the band to insure full band contact with the member and equal tensioning in the two band ends.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A clamp structure for a member to be clamped comprising in combination a strap adapted to substantially envelop the member and having free ends disposed in spaced relation substantially parallel to a perpendicular to the longitudinal central axis of the member; a saddle and post means having a post portion disposable between said ends and upon which the same may slide and elongated spaced portions adapted for member engagement and between which the strap is disposed, the opposite faces of the ends having threads thereon, and a nut threaded upon those ends, the post being of lesser cross-sectional area than the nut threaded bore.

2. A clamp structure as defined by claim 1 wherein the confronting faces of the free ends have flat faces and the post where engaged thereby has similar faces.

3. A clamp structure as defined by claim 1 wherein the nut includes a counterbore and the saddle and post means includes oppositely disposed and outwardly directed fulcrum bosses seatable in the nut counterbore.

4. A clamp structure as defined by claim 1 wherein the confronting faces of the free ends have flat faces and the post where engaged thereby has similar faces and the nut includes a counterbore and the saddle and post means includes oppositely disposed and outwardly directed fulcrum bosses seatable in the nut counterbore.

5. A clamp structure as defined by claim 1 wherein the free ends initially diverge outwardly for nut locking.

6. A clamp structure as defined by claim 1 wherein the confronting faces of the free ends have flat faces and the post where engaged thereby has similar faces and the free ends initially diverge outwardly for nut locking.

7. A clamp structure as defined by claim 1 wherein the nut includes a counterbore and the saddle and post means includes oppositely disposed and outwardly directed fulcrum bosses seatable in the nut counterbore, and the free ends initially diverge outwardly for nut locking.

8. A clamp structure as defined by claim 1 wherein the post includes opposite longitudinally disposed recesses for at least partial nesting of the adjacent free ends.

9. A clamp structure as defined by claim 1 wherein the post includes opposite longitudinally disposed recesses for at least partial nesting of the adjacent free ends, and the confronting faces of the free ends have flat faces and the post, where engaged thereby, has similar faces.

10. A clamp structure as defined by claim 1 wherein the post includes opposite longitudinally disposed recesses for at least partial nesting of the adjacent free ends, and the nut includes a counterbore and the saddle and post means includes oppositely disposed and outwardly directed fulcrum bosses seatable in the nut counterbore.

11. A clamp structure as defined by claim 1 wherein the post includes opposite longitudinally disposed recesses for at least partial nesting of the adjacent free ends, and the free ends initially diverge outwardly for nut locking.

OMAR L. FLUHARTY.

No references cited.